(12) United States Patent
Sateria et al.

(10) Patent No.: US 7,413,661 B2
(45) Date of Patent: Aug. 19, 2008

(54) METHOD FOR PURIFYING SEMICONDUCTOR GASES

(75) Inventors: Salim Sateria, Amherst, NY (US); Arthur Edward Holmer, Lewiston, NY (US); Ronald William Shrewsbury, East Amherst, NY (US)

(73) Assignee: Praxair Technology, Inc, Danbury, CT (US)

(*) Notice: Subject to any disclaimer, the term of this patent is extended or adjusted under 35 U.S.C. 154(b) by 99 days.

(21) Appl. No.: 10/452,466

(22) Filed: Jun. 2, 2003

(65) Prior Publication Data

US 2003/0205532 A1 Nov. 6, 2003

Related U.S. Application Data

(63) Continuation of application No. 09/735,802, filed on Dec. 14, 2000, now Pat. No. 6,576,138.

(51) Int. Cl.
*B01D 15/00* (2006.01)
(52) U.S. Cl. .................................................. 210/664
(58) Field of Classification Search .............. 210/664
See application file for complete search history.

(56) References Cited

U.S. PATENT DOCUMENTS

| | | | | |
|---|---|---|---|---|
| 4,376,758 A * | 3/1983 | Pagani et al. | ................ | 423/359 |
| 5,385,689 A | 1/1995 | Tom et al. | ................ | 252/194 |
| 5,846,386 A | 12/1998 | Hoffman et al. | ............. | 203/13 |
| 6,001,223 A * | 12/1999 | Hoffman et al. | ............. | 203/12 |
| 6,085,548 A * | 7/2000 | Chowdhury et al. | ......... | 62/617 |
| 6,183,539 B1 * | 2/2001 | Rode et al. | .................... | 95/117 |
| 6,576,138 B2 * | 6/2003 | Sateria et al. | ............... | 210/664 |

FOREIGN PATENT DOCUMENTS

EP 0484301 B1 10/1994

OTHER PUBLICATIONS

Thomas M. Smolen, David B. Manley and Bruce E. Poling, "Vapor-Liquid Equilibrium Data for the $NH_3$-$H_2O$ System and Its Description with a Modified Cubic Equation of State", *Journal of Chemical and Engineering Data*, vol. 36, No. 2, 1991, 202-208.

* cited by examiner

*Primary Examiner*—Chester T Barry
(74) *Attorney, Agent, or Firm*—Iurie A. Schwartz

(57) ABSTRACT

This invention is directed a method for producing an ultra-high purity semiconductor gas such as ammonia gas. The method includes the steps of directing an ammonia fluid having a liquid phase moisture content that is less than about 500 parts per million through an evaporation means, to produce purified vapor phase ammonia, and directing the purified vapor phase ammonia through an adsorption means to remove impurities therein and produce ultra-high purity ammonia gas.

13 Claims, 5 Drawing Sheets

METHOD FOR PURIFYING SEMICONDUCTOR GASES

RELATED APPLICATION

This application is a continuation of U.S. application Ser. No. 09/735,802, filed on Dec. 14, 2000, now U.S. Pat. No. 6,576,138. The entire teachings of the above application are incorporated herein by reference.

TECHNICAL FIELD

This invention relates generally to the purification of gases, and more specifically, to a method for producing purified semiconductor gases from its impure form using adsorption and evaporation techniques.

BACKGROUND ART

Ammonia is used as a source gas in the chemical vapor deposition (CVD) of nitride films during the fabrication of semiconductor chips. Typical nitrides are silicon nitride, made by the reaction of silane and ammonia and titanium nitride, made by the reaction of titanium tetrachloride and ammonia. The presence of one to three thousand parts per billion (ppb) levels of moisture vapor from ammonia cylinders will result in a decrease of the performance properties of the nitride layer. Recently, new gallium nitride CVD technology has been shown to require even lower levels of moisture in the source ammonia than silicon and titanium nitride technology. The level of moisture must be reduced to below 200 parts per billion (ppb) to avoid performance problems.

Ammonia is currently supplied to electronics customers in cylinders with a specification of less than 3 parts per million (ppm) moisture. This "high" value of moisture was actually due to the past limitations of analytical technology and not the actual attainable levels. Because of this limitation, purification efforts could not be accurately certified.

To achieve 3 ppm or less moisture, higher moisture content ammonia from the source cylinder was transfilled in the vapor phase to the designated cylinder. This treatment was found to be sufficient to remove moisture levels down to the 3 ppm specification. However, it was found that a simple vapor phase transfill was not sufficient to reach ppb levels of moisture.

Commercially available point of use in-line purifiers can be used to guarantee moisture levels lower than 3 ppm. These purifiers use a lithium based resin to remove moisture from ammonia or a zirconium-iron catalyst to remove moisture. Recent analytical technologies have shown that these purifiers will remove moisture to ppb levels. These purifiers are very expensive (3 to 5 thousand dollars) and have limited moisture capacity. They are not regenerable and must be replaced when spent. Because of these limitations, point of use in-line purifiers can not be used for large-scale purification, on the order of thousands of pounds per day.

It would be desirable in the art to provide an economical method for purifying semiconductor gases of low moisture level (less than about 200 ppb).

SUMMARY OF THE INVENTION

The above and other objects, which will become apparent to one skilled in the art upon a reading of this disclosure, are attained by the present invention, one aspect of which is a method for purifying an impure gas to produce an ultra-high purity gas comprising the steps of a) passing the impure liquefied gas through a first adsorption means to remove impurities from the liquid phase therein to produce a first purified fluid; b) passing the first purified fluid through an evaporation means to remove impurities therein to produce a second purified gas; and c) passing the second purified gas through a second adsorption means to remove impurities from the vapor phase therein to produce the ultra-high purity gas.

As used herein, the term "impurities" means any undesirable materials in the gas stream to be purified. The impurities is primarily water, but also includes other volatile impurities like carbon dioxide, sulfur dioxide, as well as particulates from the evaporation process.

BRIEF DESCRIPTION OF THE DRAWINGS

Other objects, features and advantages will occur to those skilled in the art from the following description of preferred embodiments and the accompanying drawings in which.

DETAILED DESCRIPTION

This invention uses a combination of liquid phase adsorption, filtration, evaporation (or distillation) and vapor phase adsorption to produce ammonia with less than 200 ppb moisture. The non-volatile residue is also reduced to non-detectable limits of less than 1 ppb, based on a 99.9999999% filter efficiency. Each of the parts of this invention will not purify the ammonia to less than 200 ppb moisture. Only the proper combination and sequence will produce the desired impurity reduction of less than 200 ppb moisture.

The proposed novel process produces ammonia with low ppb (<200 ppb) moisture levels. The low moisture level is confirmed by the new Fourier Transform Infrared (FTIR) analytical technique developed by Praxair. Since the process uses commercially available adsorbents instead of point of use purifiers, it costs less to purify each pound of ammonia. The ammonia is then filled into cylinders that can be used without expensive point of use purifiers.

There are three general ways to remove moisture from ammonia: 1) chemical reaction, 2) adsorption and 3) physical methods such as evaporation or distillation.

An example of a chemical reaction removal method is the use of magnesium nitride to react with the moisture in an ammonia stream. This reaction produces magnesium hydroxide and more ammonia. Chemical reactants such as magnesium nitride are very expensive, costing on the order of one dollar per gram. Each gram of magnesium nitride will react with approximately one gram of water. This works out to be approximately one dollar per gram of water removed from the ammonia. Since the magnesium nitride is not regenerable, this means it is not economical for use in processes designed to purify thousands of pounds of ammonia per day. A similar example is the lithium resin based purifiers mentioned above.

Adsorption techniques are much more useful for moisture removal. Wet ammonia can be dried by passing the liquid phase through well conditioned 3A molecular sieve. Experimental data collected by Praxair has shown that approximately 90% of the moisture in liquid phase ammonia can be removed by passing it through a 3A molecular sieve bed. To minimize non-volatile contamination, particulate filters must be placed down stream of the molecular sieve bed.

Figure 1:
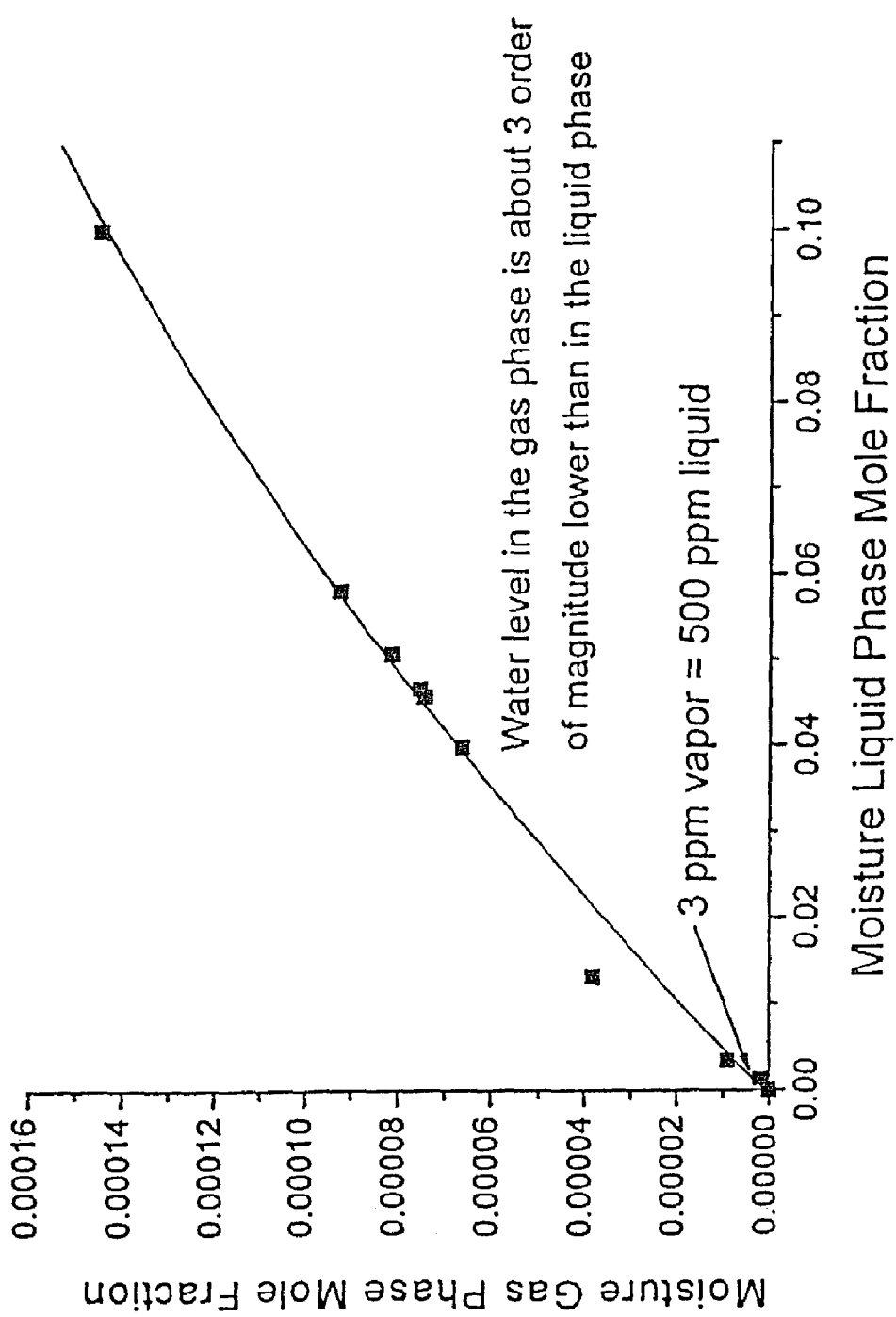
FIG. 1 is a graphical representation of the moisture-ammonia vapor liquid equilibrium.

Physical methods are also useful for removing moisture from ammonia. Typical 99.999% ("5.0 grade") electronic grade ammonia is certified to meet a 3 ppm moisture specification. According to the vapor-liquid equilibrium of trace moisture in ammonia, a moisture concentration of 3 ppm in the vapor phase corresponds to a liquid phase concentration of greater than 500 ppm. FIG. 1 shows the vapor-liquid equilibrium data for the trace moisture-ammonia system. The data shows that most of the moisture resides in the liquid phase. The concentration of moisture in the liquid phase is approximately 2 to 3 orders of magnitude greater than the concentration in the vapor phase. This equilibrium advantage has been used in the past to remove moisture to a 3 ppm specification level by vapor phase transfill. The equilibrium data shows that much lower levels of moisture can be attained. There are some practical problems and these will be discussed later.

From this brief discussion it would appear that either adsorption or a physical method could be used as a basis for an economical ammonia purification process. However, efficiency of moisture removal in adsorption beds, vapor liquid equilibrium restrictions in physical methods and a chemical equilibrium between moisture and ammonia prevent the reduction of moisture levels to below 200 ppb in a single step operation.

The approach that was successfully demonstrated is as follows. First, remove as much moisture from the ammonia liquid phase as is possible by adsorption on 3A molecular sieve. The next step is to evaporate (or distill) the ammonia to take advantage of the favorable vapor-liquid equilibrium distribution of moisture to reduce the moisture concentration by an additional 2 to 3 orders of magnitude. The final step is to remove any chemically bound moisture in the vapor phase ammonia obtained from evaporation (or distillation) by passing the vapor phase through another 3A molecular sieve trap. The ultra-low moisture content ammonia is then condensed for storage or filling into cylinders.

Liquid Phase Adsorption Bed Details

Passing ammonia with about 600 ppmw (weight/weight) of moisture in the liquid phase through a bed of 3A molecular sieve reduces the moisture content to about 40 to about 60 ppmw, preferably about 50 ppmw. Passing another ammonia sample that contained about 130 to about 170 ppmw, preferably about 150 ppmw in the liquid phase through the molecular sieve bed reduced the moisture content to about 9 to about 13 ppmw, preferably about 11 ppmw. In both cases, about 90% of the moisture is removed from the liquid phase by passing the sample through the bed. Some particulates were passed from the bed during the moisture removal. A particulate filter was installed downstream of the bed and was found to be effective for removal of non-volatile residue and metallic particulates from the ammonia to the sub ppb level. However, moisture levels in the low ppm range are still not low enough for current nitride applications.

Evaporation/Distillation Details

Based on the vapor-liquid equilibrium data shown in FIG. 1, moisture can be reduced further by evaporating or distilling the ammonia from the liquid phase to a vapor phase, sometimes known as a "vapor phase transfill". A careful vapor phase transfill can reduce moisture content by two orders of magnitude, i.e. from 100 ppm to less than 1 ppm. This purification is only achieved when the flow rate of the transfill is carried out without any boiling of the liquid ammonia. If boiling occurs, no purification will be accomplished as all the moisture in the liquid phase will simply vaporize into the gas phase. However, if boiling is avoided, a gas phase transfill will allow the system to maintain the favorable vapor-liquid equilibrium moisture distribution and produce a two order of magnitude moisture concentration reduction.

There is a limitation to the above-described evaporation. Not all of the ammonia can be vapor transfilled. Based on the mass balance of the moisture left in the source cylinder, the level of moisture in the liquid phase will continue to increase as ammonia vapor is withdrawn from the cylinder. To illustrate this phenomena, a computer model was developed for establishing the relationship between a given liquid phase moisture concentration and the resultant vapor phase moisture concentration in an ammonia system from which vapor is being withdrawn. The model assumes an isothermal evaporation during the transfill using the vapor-liquid equilibrium data shown in FIG. 1.

Figure 2:
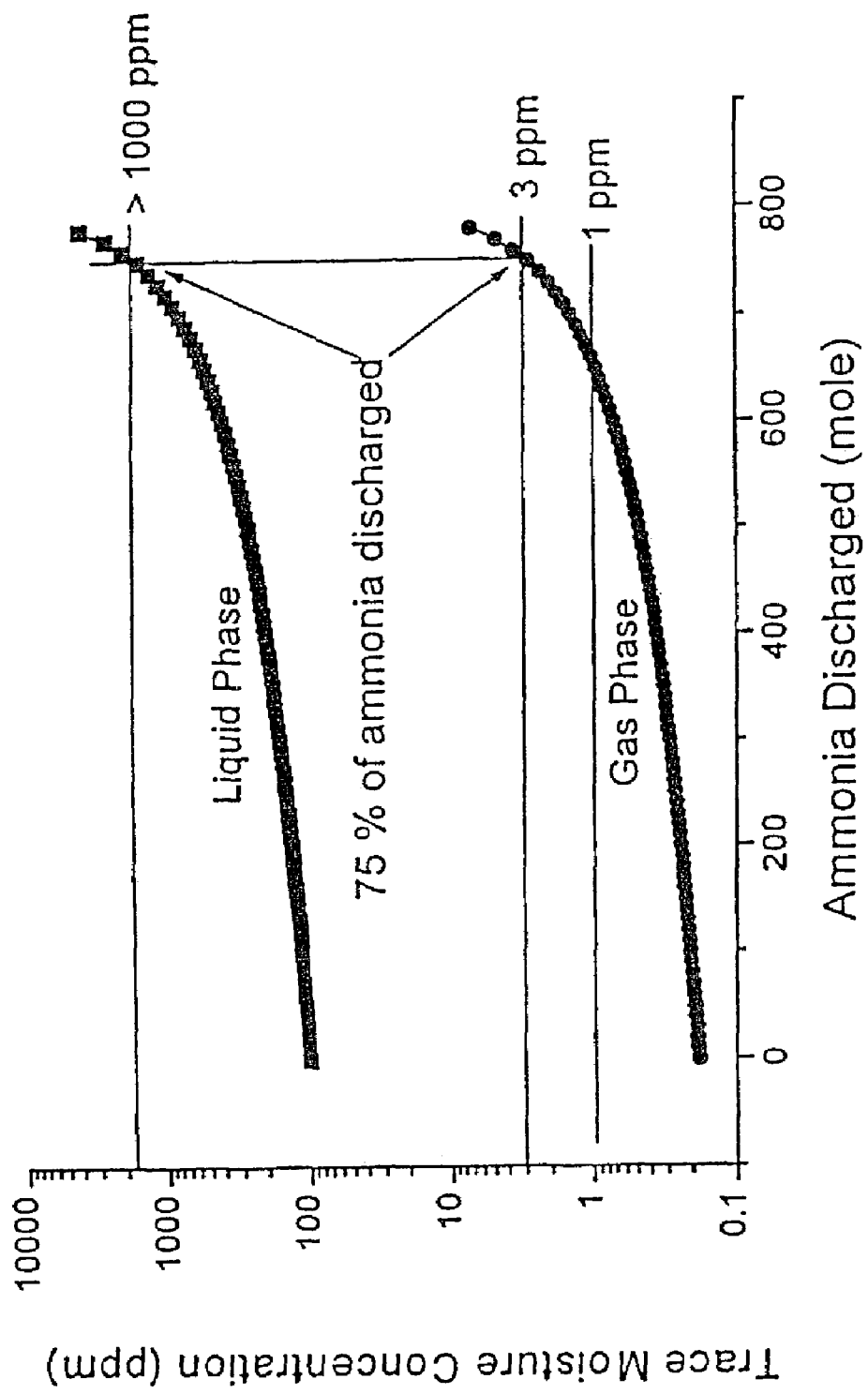
FIG. 2 is a graphical representation of the changes of the moisture levels in gas and liquid during the transfill process.

FIG. 2 shows the graph of the simulation of the moisture content in liquid and vapor phase during the transfill from a source cylinder. According to FIG. 2, starting from a 100 ppm liquid moisture in ammonia mixture, the vapor transfill will consistently deliver vapor phase moisture concentrations of less than about 3 ppm moisture until about 75% of the ammonia has been evaporated. At this point, the concentration of moisture in the source liquid ammonia increases to greater than about 500 ppm and the vapor concentration to greater than about 3 ppm. This is now an unfavorable situation as the more moisture that is transfilled, the more the final product ammonia will have.

Vapor transfill also produces a reduction in the metallic impurities of the final product ammonia. Metallic impurities are often in the form of a non-volatile residue and will not be carried into the vapor phase during the evaporation step.

As an option, the evaporation means may comprise a distillation column with a reboiler or a single step distillation.

Vapor Phase Adsorption Bed Details

Since the moisture concentration of the vapor ammonia will still be a few ppm and may be chemically bound to the ammonia, another moisture concentration reduction step must be taken to ensure very low ppb levels of moisture in the final product ammonia. This is accomplished by passing the ammonia vapor through another bed of molecular sieve. The vapor phase ammonia with a moisture concentration of about 2 ppm can be reduced to less than about 100 ppb by passing through a 3A molecular sieve bed. The ammonia is now dry enough for nitriding applications and can be condensed for storage in cylinders.

Bed Conditioning Details

The 3A molecular sieve bed is conditioned at a temperature of 350° C. under continuous flow of an ultra-high purity inert gas such as nitrogen, argon or helium certified to have a moisture concentration of less than about 10 ppb for about 200 hours. This is considered a well-conditioned bed. It should be noted that conditioning the molecular sieve bed depends on a number of parameters including the flow rate, the amount of contaminants in the bed, the duration of conditioning and the temperature in the bed conditioning process, and the practice of such conditioning is known to those skilled in the art.

Preferred Embodiment

Figure 3:
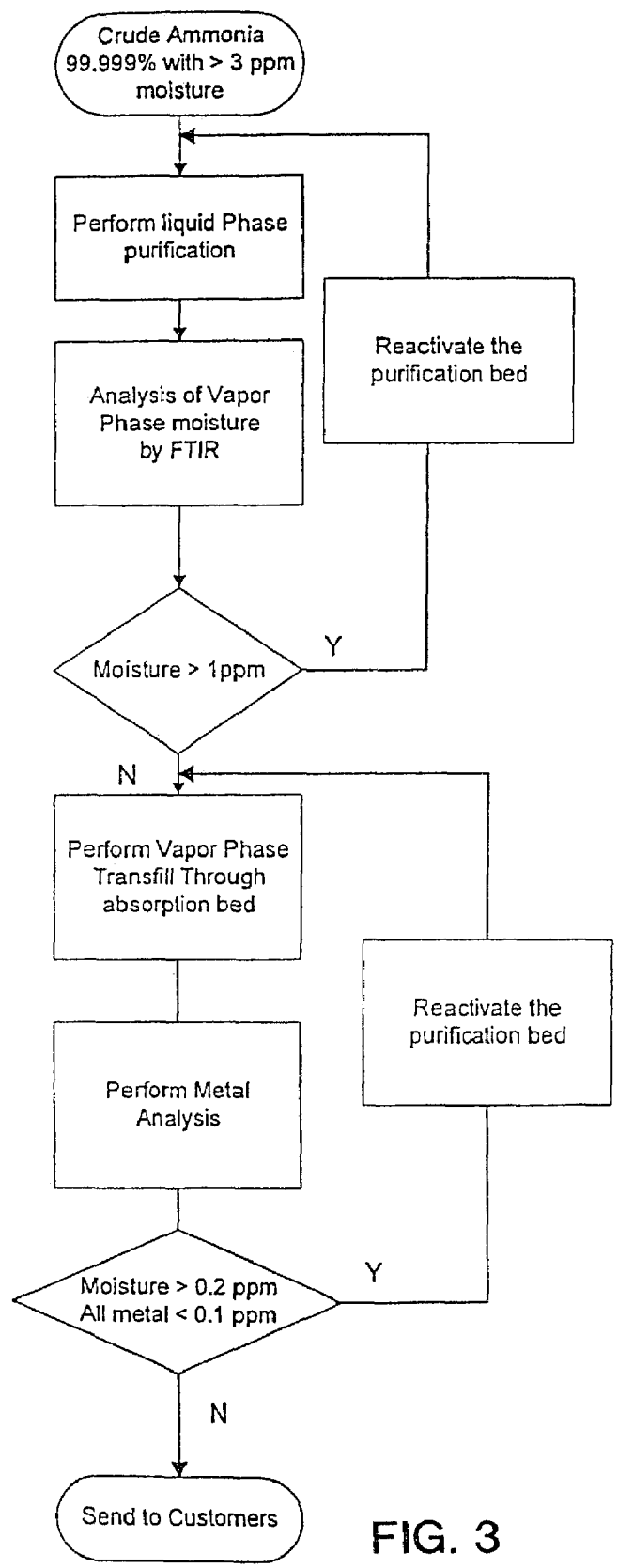
FIG. 3 is a schematic representation of the ammonia purification steps.

A schematic diagram (flow chart) of the best practice mode is given in FIG. 3. This model assumes that the purification is performed on the current grade 5.0 electronic ammonia with an about 3 ppm vapor phase moisture specification. According to data given in FIG. 1, the liquid phase moisture concentration will be above about 500 ppm. The first step is to pass the liquid ammonia through the 3A molecular sieve bed. The bed will remove about 90% of the moisture content, leaving approximately 50 ppm. Again from FIG. 1, the vapor phase moisture concentration of this liquid ammonia will be less than about 1 ppm. To confirm the moisture level, the vapor phase of this product is analyzed for moisture content and if it is less than about 1 ppm, allowed to pass to then next step. If the vapor phase moisture content is greater than about 1 ppm, the bed must be reactivated and the ammonia processed again. To reduce particulate contamination from the sieve bed the liquid ammonia is passed though a 0.1 micrometer filter. The next step is to perform a vapor phase transfill. Based on the data shown in FIGS. 1 and 2, a careful vapor phase transfill will reduce the moisture concentration to less than one ppm. This vapor is then passed through another 3A molecular sieve bed to reduce the moisture level to the ppb range. The vapor product is analyzed for metals and moisture. If the levels are greater than about 0.2 ppm and 0.1 ppm for moisture and metals respectively, the purification bed must be reactivated and the filter changed. The ammonia will have to be reprocessed. The procedure is stopped after about 75% of the ammonia has been evaporated. At this point the level of moisture in the liquid ammonia will be several hundred ppm. The vapor phase will have approximately 3 ppm. This ammonia will have to be taken back to the beginning of the process for further purification. The process ensures efficient removal of moisture with close to full recovery of ammonia. Since the molecular sieve bed is regenerable, there is minimal cost for disposal of adsorbent materials.

EXAMPLE 1

Figure 4:
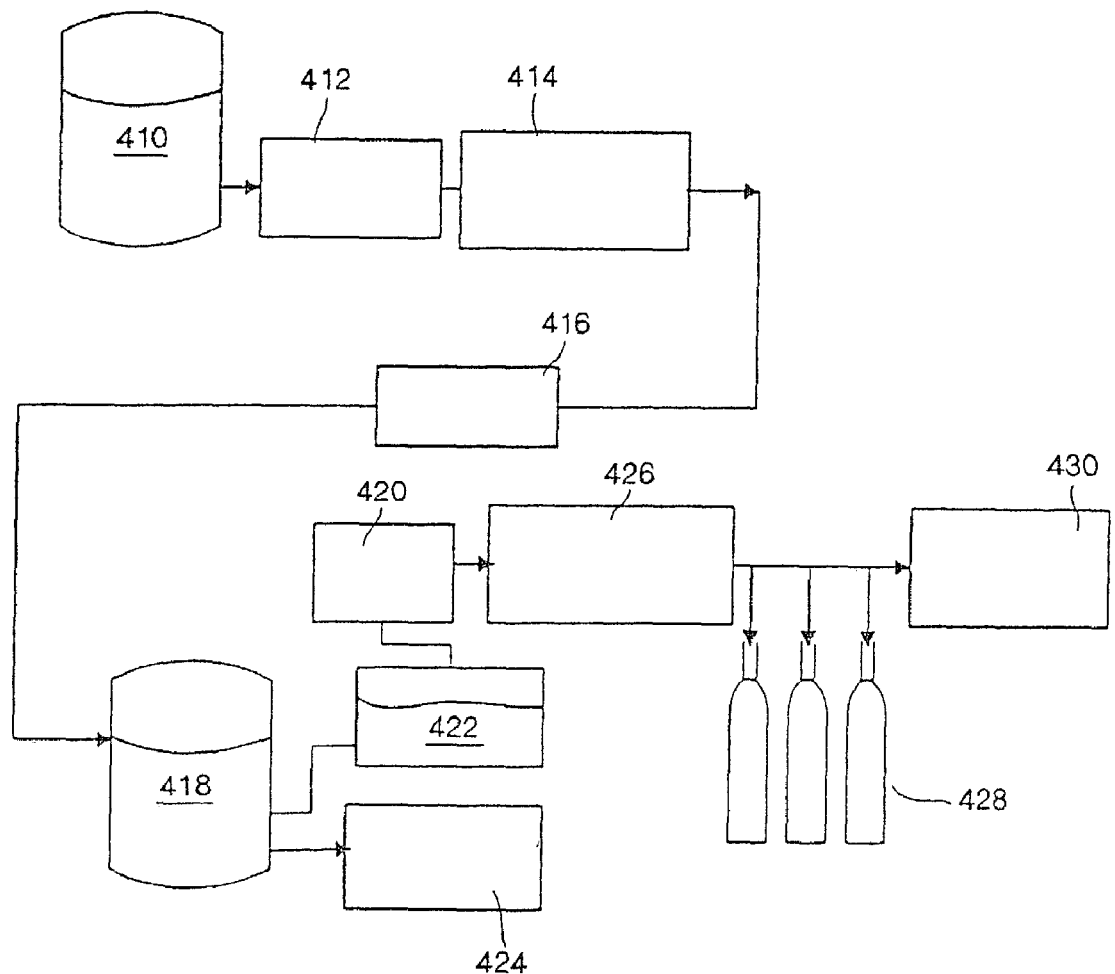
FIG. 4 is a schematic diagram of a batch process system for ammonia purification.

FIG. 4 shows one example of a batch set-up for application of this purification strategy. The set-up consists of two unit operations, the first for the liquid phase transfill and the second for the vapor transfill system.

In the liquid transfill system the crude ammonia is stored in storage tank 410. The liquid delivery of the crude product is performed through the use of a mechanical pump, inert gas pad or by the ammonia head pressure. The liquid ammonia is passed through metering device 412 into an adsorption bed 414, which also incorporates filters to trap particulate through particulate filter 416. Bed 414 is a well-conditioned 3A molecular sieve bed. Metering device 420, such as a flow meter, is used to meter the flow of the liquid. The purified product is stored in tank 418. The product is then analyzed by analyzing device 424 to ensure vapor phase concentrations of moisture are below about 1 ppm. If the moisture concentration is above about 1 ppm, then the adsorption bed 414 must be regenerated and the ammonia processed again. If the vapor phase concentration of moisture is below about 1 ppm, then the ammonia is transferred to evaporator system 422.

The flow from evaporator 422 is metered by flowmeter 420 to ensure that no rapid boiling of ammonia occurs during the vapor phase transfill. If boiling occurs, it will result in an increase in the moisture concentration of the transfilled product. The ammonia vapor is then passed through adsorption bed 426. Bed 426 is a well-conditioned 3A molecular sieve bed. The product is analyzed for moisture content by analyzing device 430. If the moisture concentration is above about 200 ppb, the adsorption bed must be regenerated and the ammonia reprocessed. If the moisture concentration is below about 200 ppb, the ammonia vapor can be condensed into cylinders 428, or a storage tank for later cylinder filling. Condensation can be accomplished by a cooling coil or cooling the receiving vessels.

EXAMPLE 2

Figure 5:
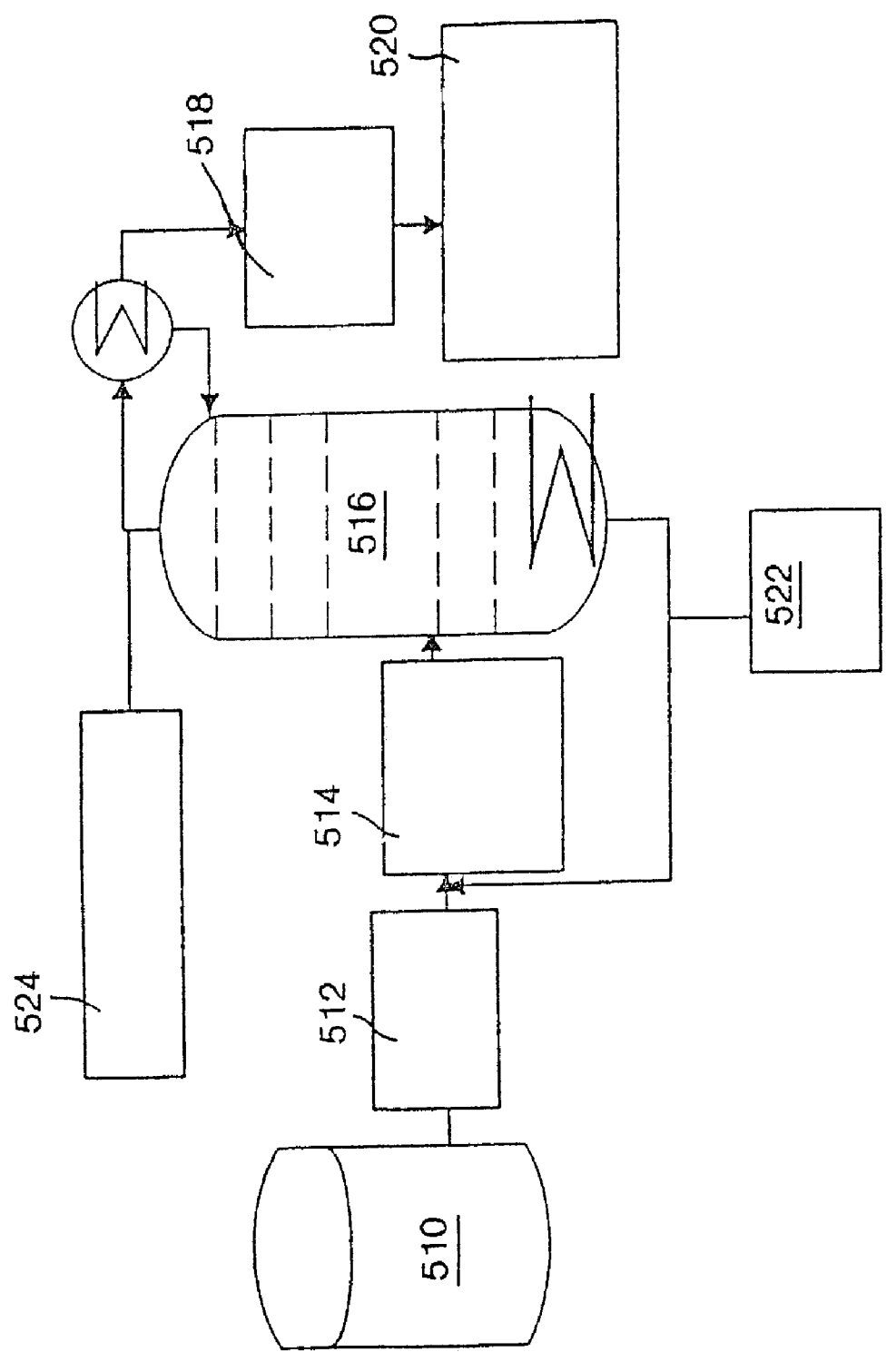
FIG. 5 is a schematic diagram of a continuous process system for ammonia purification.

The strategy of achieving low moisture content using adsorption and vapor transfill can be extended to a continuous large scale system illustrated in FIG. 5. The set-up consists of distillation system 516, and two adsorption beds, 514 and 518. Crude ammonia is stored in tank 510. The liquid delivery of the crude product is performed through the use of a mechanical pump, inert gas pad or by the ammonia head pressure. The liquid ammonia is passed into adsorption bed 514, which also incorporates filters to trap particulates. Bed 514 is a well-conditioned 3A molecular sieve bed. A metering device 512, such as a flow meter, is used to meter the flow of the liquid. The purified product is then analyzed by analyzing device 522 to ensure that vapor phase concentrations of moisture are below about 1 ppm. If the moisture concentration is above about 1 ppm, then adsorption bed 514 must be regenerated and the ammonia processed again. If the vapor phase concentration of moisture is below about 1 ppm, then the ammonia is transferred to the distillation system 516.

The purified liquid ammonia is vaporized and some of this vapor is recondensed to act as wash fluid for the vaporizing ammonia. The vapor product is analyzed for metals and moisture by analyzing device 524. The purified ammonia product is removed from the top plate of the distillation column in the vapor phase. This vapor product is then passed through adsorption bed 518 for final moisture removal. Bed 518 is a well-conditioned 3A molecular sieve bed. The final purified ammonia is collected in tank 520.

Key Process Parameter Summary (FIGS. 4 and 5)

The liquid phase adsorption step is used to remove approximately 90% of the moisture content of the starting ammonia, to a level below about 50 ppm. This is an important parameter as this reduction is essential for the evaporation (or distillation) step to work correctly. As discussed earlier, if there is more than about 500 ppm of water in the liquid phase, the evaporation will not produce a moisture concentration of less than 3 ppm. This in turn will affect the vapor phase adsorption step and it will not produce ammonia with less than 200 ppb moisture. Another important parameter is the liquid phase filtration. This step removes non-volatile solids from the liquid ammonia to less than about 1 ppb.

The whole purification strategy can be extended to other gases used by the microelectronics industry or any other industry for that matter. There are two fundamental requirements. The first is that the impurity of interest must have a greater affinity for the liquid phase of the product than the vapor phase of the product being purified. The second is that the impurity of interest must have a greater affinity for an adsorbent material than for the liquid or vapor phase of the product being purified. Specific examples would include hydrogen chloride, hydrogen bromide, chlorine and ammonia. In these cases, the impurity of interest is moisture, but this may be generalized to some other impurity that fits the two fundamental requirements mentioned above.

There are also extensions within the strategy itself. The first alternative we must consider is the use of other adsorbents in the adsorbent beds. The best practice mode uses 3A molecular sieve as the adsorbent material. Other possible adsorbents include other molecular sieves (5A, 4A, 13X and AW 500). 5A molecular sieve did not appear to perform as well as 3A molecular sieves. However, some moisture was removed by the 5A sieve. Hence, all the sieves could be viewed as possible alternative adsorbents. Additional alternative adsorbents include well-conditioned silica gel and activated alumina. Activated charcoal is also a possibility for impurities other than moisture.

The second alternative that must be considered is the use of inert padding gas or head pressure as a substitute for mechanical pumping. The best practice mode uses a pump because the best flow control can be obtained with relatively low cost. However, inert padding gases, such as helium, argon or nitrogen could be used to create additional pressure in the system to move liquid ammonia through the adsorption beds. Lastly, additional head pressure could by creating by heating the crude ammonia to raise its vapor pressure. This additional pressure could then be used to move the liquid ammonia through the adsorption beds.

Specific features of the invention are shown in one or more of the drawings for convenience only, as one or more features may be combined with another feature in accordance with the invention. Alternative embodiments will be recognized by those skilled in the art, and are intended to be included within the scope of the claims.

What is claimed is:

1. A method for producing ultra-high purity ammonia gas, comprising the steps of:
   a) directing an ammonia fluid, having a liquid phase moisture content that is less than about 500 parts per million, through an evaporation means, including distillation and reboiling of said ammonia fluid to produce purified vapor phase ammonia; and
   b) directing the purified vapor phase ammonia through an adsorption means to remove impurities therein, thereby producing the ultra-high purity ammonia gas.

2. The method of claim 1 wherein directing said ammonia fluid through said evaporation means includes distillation of said partially purified ammonia fluid at said evaporation means.

3. The method of claim 1, wherein directing said ammonia fluid through said evaporation means includes a single step distillation of said ammonia fluid at said evaporation means.

4. The method of claim 1, wherein directing said ammonia fluid through said evaporation means includes a vapor phase transfill of said ammonia fluid at said evaporation means.

5. The method of claim 1, further including the step of removing impurities by adsorption on activated charcoal.

6. The method of claim 1, wherein said impurities include water.

7. The method of claim 5, wherein the impurities further include a particulate impurity.

8. The method of claim 1, wherein said adsorption means includes an adsorbent selected from the group consisting of a molecular sieve adsorbent, activated charcoal, silica gel and activated alumina.

9. The method of claim 6, wherein the molecular sieve adsorbent is a 3A molecular sieve, a 4A molecular sieve, a 5A molecular sieve, a 13X molecular sieve or a AW 500 adsorbent.

10. The method of claim 1, wherein the purified vapor phase ammonia has a moisture content that is less than about 3 parts per million.

11. The method of claim 1, further comprising the step of producing said ammonia fluid.

12. A method for producing ultra-high purity liquid ammonia, comprising the steps of:
   a) directing an ammonia fluid, having a liquid phase moisture content that is less than about 500 parts per million, through an evaporation means, including distillation and reboiling of said ammonia fluid to produce purified vapor phase ammonia;
   b) directing the purified vapor phase ammonia through an adsorption means to remove impurities therein, thereby producing an ultra-high purity ammonia gas;
   c) condensing the ultra-high purity ammonia gas to produce the ultra-high purity liquid ammonia.

13. The method of claim 12, further comprising the step of producing said ammonia fluid.

* * * * *